United States Patent
Murakami

(10) Patent No.: US 7,235,954 B2
(45) Date of Patent: Jun. 26, 2007

(54) LOAD DRIVING DEVICE AND PORTABLE APPARATUS UTILIZING SUCH DRIVING DEVICE

(75) Inventor: Sadakazu Murakami, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 305 days.

(21) Appl. No.: 10/879,315

(22) Filed: Jun. 29, 2004

(65) Prior Publication Data

US 2005/0007085 A1 Jan. 13, 2005

(30) Foreign Application Priority Data

Jul. 7, 2003 (JP) ............................ 2003-192784
Sep. 29, 2003 (JP) ............................ 2003-337344

(51) Int. Cl.
*G05F 1/10* (2006.01)
*H05B 37/00* (2006.01)
*H01S 3/00* (2006.01)
*H02H 7/10* (2006.01)

(52) U.S. Cl. ................ 323/222; 315/185 R; 372/38.04

(58) Field of Classification Search ............... 323/222, 323/226, 233, 268, 271, 273, 275–277, 282, 323/285; 372/38.01, 38.03, 38.04; 345/82, 345/84; 315/185 R, 186, 193, 291

See application file for complete search history.

(56) References Cited

U.S. PATENT DOCUMENTS 5,966,395 A 10/1999 Ikeda
6,229,833 B1 5/2001 Noda et al.
6,400,102 B1 * 6/2002 Ghanem ..................... 315/291
6,587,490 B2 * 7/2003 Crawford .................. 372/38.07
6,697,402 B2 * 2/2004 Crawford .................. 372/38.03
2003/0062881 A1 4/2003 Crawford
2005/0128168 A1 * 6/2005 D'Angelo ..................... 345/82
2005/0168419 A1 * 8/2005 Shimizu ....................... 345/82

FOREIGN PATENT DOCUMENTS

JP 61-254070 11/1986
JP 0 567 280 10/1993
JP 11-038049 2/1999
JP 2001-313423 11/2001

OTHER PUBLICATIONS

Khan, et al., "Power Electronics In Automotive Electrical Systems", 1999 IEEE, pp. 29-38.

* cited by examiner

*Primary Examiner*—Matthew V. Nguyen
(74) *Attorney, Agent, or Firm*—Hogan & Hartson LLP

(57) ABSTRACT

A load such as an LED and a constant-current source are connected in series with each other between the node of a dc-dc conversion type power supply circuit providing an output voltage and the ground. The constant-current source provides a constant current Io, the magnitude of which can be adjusted. The power supply circuit controls the output voltage such that the voltage drop across the constant-current source serving as a detection voltage becomes equal to a reference voltage. Thus, the load current can be varied within a predetermined range while avoiding the power loss due to an increase in the load current, thereby always permitting efficient operation of the load.

16 Claims, 8 Drawing Sheets

LOAD DRIVING DEVICE AND PORTABLE APPARATUS UTILIZING SUCH DRIVING DEVICE

FIELD OF THE INVENTION

This invention relates to a device for driving a load (load driving device) with the output voltage by converting an inputted power supply voltage by means of a dc-dc conversion type power source circuit, and to a portable apparatus equipped with such load driving device.

BACKGROUND OF THE INVENTION

There have been many devices in use for driving loads such as LEDs, utilizing a dc-dc conversion type power supply circuit adapted to provide an output voltage different from an inputted power supply voltage. A typical load driving device has a power supply circuit that generates a predetermined output voltage and an output current for driving a load, as disclosed in Japanese Patent Application Laid Open No. 2001-313423. For this purpose, the level of the output voltage or the output current supplied to the load is measured to establish a detection voltage or detection current, which is fed back to a control circuit of the power supply circuit.

In such conventional load driving device, the detection voltage is obtained by dividing the output voltage in a voltage dividing circuit having a high resistance. The detection current is obtained by detecting the potential drop across a resistor (referred to as voltage detection resistor) connected in series with the load, whereby the load current flows through the resistor. The detection voltage (or detection current) is compared with a reference value, so that the output voltage (current) outputted from the power supply circuit is controlled based on the comparison.

In a portable electronic device such as a cellular phone, the load current is sometimes increased or decreased within a permitted range in response to a request made during service. For example, when the load is a light emitting diode (LED), a request is made to regulate the luminance of the LED to an arbitrary level.

In such a case as mentioned above, the voltage detection resistor connected in series with the load will increase energy loss when the load current is increased. Therefore, the overall efficiency of the electronic device that includes a power supply circuit and a load disadvantageously drops when the load current becomes large (i.e. during a heavy duty).

In another case, a request is made to drive one load with a constant current and at the same time to drive another load with a voltage above a predetermined voltage. In such case, conventionally it is necessary to provide a further appropriate power supply circuit to meet individual use conditions, which requires additional space and cost for the power supply circuit and load.

SUMMARY OF THE INVENTION

It is, therefore, an object of the invention to provide a load driving device having a dc-dc conversion type power supply circuit for generating an output voltage by converting a power supply voltage (an input voltage), the power supply circuit capable of adjusting the magnitude of the load current within a predetermined range while avoiding the energy loss caused by an increase in the load current, thereby enabling efficient driving of the load.

It is another object of the invention to provide a portable apparatus equipped with such load driving device.

It is a further object of the invention to provide a load driving device having a dc-dc conversion type power supply circuit for generating an output voltage by converting a power supply voltage, the power supply circuit capable of driving a multiplicity of loads having different use conditions, including at least one constant-current type load and another type of load, and capable of adjusting the magnitude of the load current supplied to the constant-current type load within a predetermined range while maintaining the output voltage to another type of load above a predetermined voltage.

It is a still further object of the invention to provide a portable electronic apparatus equipped with such load driving device.

A load driving device of the invention has a power supply circuit for supplying to a load an output voltage by converting an input voltage and a constant-current source connected in series with the load and capable of providing a constant current that can be adjusted in magnitude (such current hereinafter referred to as adjustable constant current and current source referred to as variable-current type current source), wherein the power supply circuit is adapted to control the output voltage so as to keep constant the voltage at the node of the load and constant-current source. The constant-current source has a current mirror circuit constituted of a constant-current circuit providing an adjustable constant current (adjustable-current type constant-current circuit), an input-side current mirroring transistor connected in series with the constant-current circuit, and an output-side current mirroring transistor receiving the same control input as the input-side transistor, wherein the adjustable constant current is supplied to the output-side transistor. The constant voltage is higher than the saturation voltage of the output-side current mirroring transistor.

In accordance with the invention, in addition to a dc-dc conversion type power supply circuit employed to provide an output voltage by converting an input voltage, a constant-current source providing an adjustable constant current may be connected in series with a load that has an operating point that depends on the magnitude of the current flowing through it (e.g. a set of LEDs). Thus, it is possible to provide the load with a required magnitude of current in a stable manner.

The output voltage of the dc-dc conversion type power supply circuit is controlled such that the voltage drop across the constant-current source becomes equal to a reference voltage, where the reference voltage is set to secure stable operation of the constant-current source. Thus, the output voltage of the dc-dc conversion type power supply circuit is automatically adjusted so that a magnitude of current required by respective LEDs for proper luminance will flow through it even when the LEDs fluctuate in luminescence characteristic.

As described above, the voltage drop across a constant-current source is controlled automatically to become equal to the reference voltage so that the current is maintained at the preset magnitude. Therefore, even if the currents flowing through the LEDs grow larger, there will be no such energy loss as would be incurred by a voltage detecting resistor. Thus, substantially no extra energy loss is caused by an increase in the load current that the load driving device of the invention can efficiently drive a load over a wide range of load current.

An adjustable-current type constant-current source can be provided for each load consisting of a set of LEDs in such a way that the dc-dc conversion type power supply circuit is controlled based on the lowest one of the voltage drops across the constant-current sources. This ensures stable supply of a predetermined constant current to each of the LEDs constituting the load.

A load driving device in accordance with the invention comprises a power supply circuit for supplying to a load an output voltage by converting an input voltage; and a variable-resistance means having a resistance that varies in response to a control signal and a current detection means for detecting the magnitude of the current flowing through said variable-resistance means, both means connected in series with said load, wherein said power supply circuit is fed with a first reference voltage and a first detection voltage provided by said current detection means, and controls said output voltage so as to equalize said first detection voltage to said first reference voltage.

The variable-resistance means has a low resistance when a voltage indicative of said output voltage exceeds a predetermined voltage, and has a resistance that increases in accord with the decrease in the voltage indicative of said output voltage below said predetermined voltage.

In accordance with the invention, a multiplicity of load has different load characteristics. For example, a constant-current load can be driven by a constant current with its magnitude varied within a predetermined range by use of a power supply circuit such as a dc-dc conversion type power supply circuit generating an output voltage by converting an input power supply voltage, and at the same time another load other than constant-current type can be driven by keeping the output voltage above a predetermined level for the load.

For a constant-current load, such as a set of LEDs, having an operating point that depends on the magnitude of the current flowing through it, an adjustable-current type constant-current source may be connected in series with the load. It is thus possible to provide the load with a required magnitude of current in a stable manner.

When the output voltage exceeds the predetermined voltage, the output voltage of the dc-dc conversion type power supply circuit is controlled so as to equalize the voltage drop across the constant-current source to a reference voltage, where the reference voltage is set to secure stable operation of the constant-current source. Thus, the output voltage of the power supply circuit is automatically adjusted so that the magnitude of current necessary for the set of LEDs of the load to emit a predetermined amount of light will flow through them even if the LEDs in the load fluctuate in luminescent characteristic.

Moreover, when the output voltage tends to drop below the predetermined voltage due to the adjustment of current for the LEDs, the output voltage may be controlled to remain at the predetermined voltage. Thus, it is possible to secure the predetermined output voltage for the non-constant-current type load.

DETAILED DESCRIPTION OF THE PREFERRED EMBODIMENTS

The invention will now be described in detail by way of example with reference to the accompanying drawings.

Figure 1:
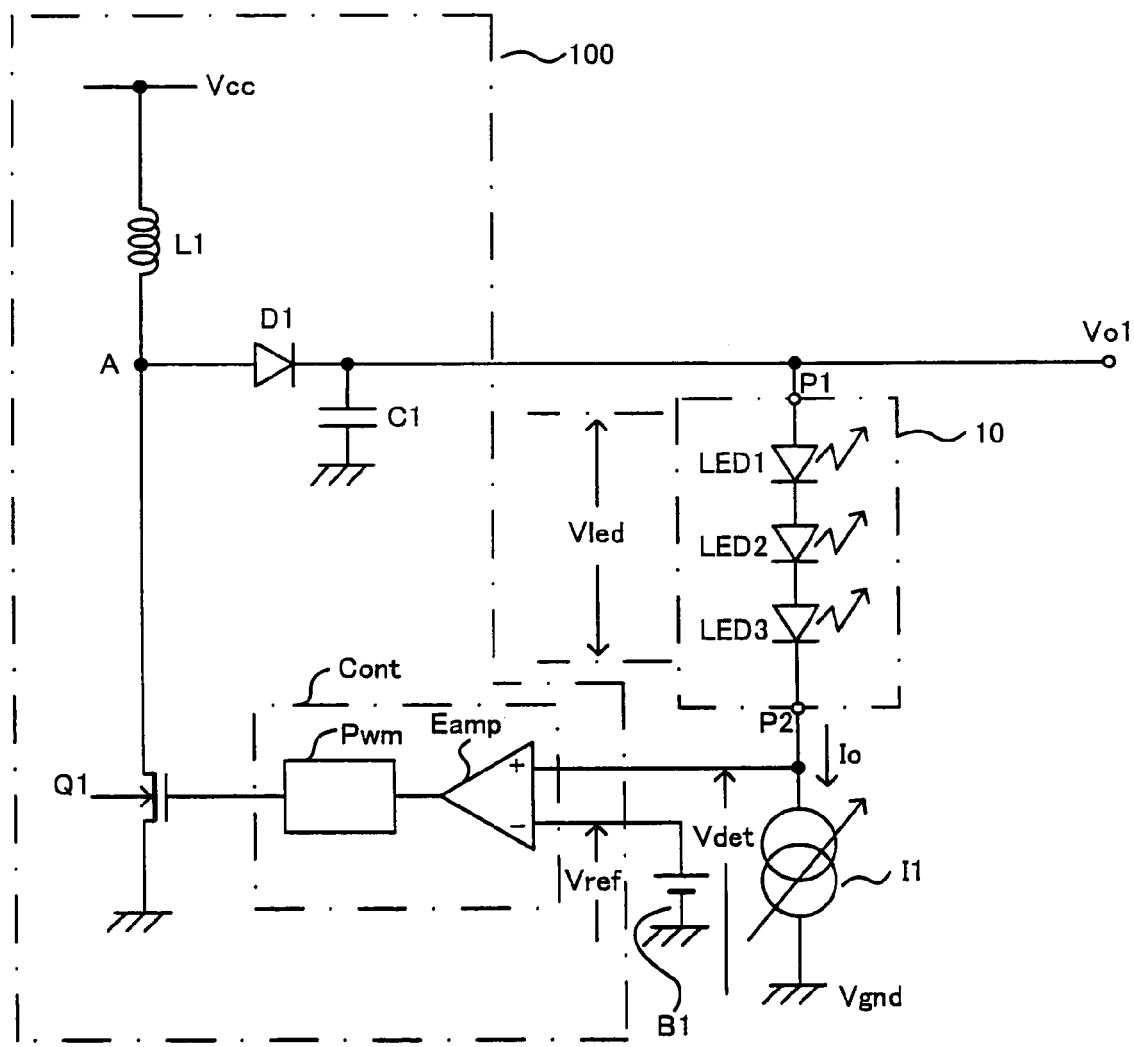
FIG. 1 is a schematic circuit diagram of a load driving device in accordance with a first embodiment of the invention.

As shown in FIG. 1, a switching power supply circuit 100 is a voltage step-up type switching power supply circuit for stepping up an input dc voltage Vcc (referred to as input voltage) to provide a stepped up dc output voltage Vo1.

A coil L1 and a switch Q1 in the form of N-type MOS transistor are connected in series between the power supply voltage Vcc and the ground. The voltage at node A of the coil L1 and switch Q1 is rectified by a rectifying diode D1 and smoothed by a smoothing capacitor C1. The smoothed voltage is provided as the output voltage Vo1. In what follows voltages represent potentials relative to the ground unless otherwise states.

Connected in series between a terminal point P1 having the output voltage Vo1 and the ground is an external load 10 and a constant-current source I1. The operating point of the external load 10 depends on the magnitude of the current that flows through it. The external load 10 is provided with a drive current Io having a predetermined magnitude set by the constant-current source I1. The voltage generated at one terminal P2 of the constant-current source I1 is taken as a detection voltage Vdet.

A control circuit Cont receives the detection voltage Vdet and a reference voltage Vref from a reference voltage source B1, and generates a switching signal for controlling the switching of the switch Q1 so as to equalize the detection voltage Vdet to the reference voltage Vref. In the example shown herein, the control circuit Cont includes an error amplifier Eamp for amplifying the difference between the reference voltage Vref and the detection voltage Vdet, and a pulse-width-modulation (PWM) control circuit Pwm for generating a PWM signal based on the output of the error amplifier Eamp. The PWM signal is provided as the switching signal.

The external load 10 is connected between the terminals P1 and P2. The invention may incorporate such external load in a portable electronic apparatus. In that case, the terminals P1 and P2 may be omitted.

An example of the external load 10 is a set of light emitting diodes (LEDs) LED1–LED3. In the example shown herein, the LEDs are white LEDs, which are used, for example, in a liquid crystal display (LCD) panel or as a backlight of a key. Although only three serial LEDs are shown in FIG. 1, the invention may encompass more than three LEDs connected in different configurations (serial, parallel, or combination of serial and parallel connections) depending on the luminance required and the area to be illuminated.

Figure 2:
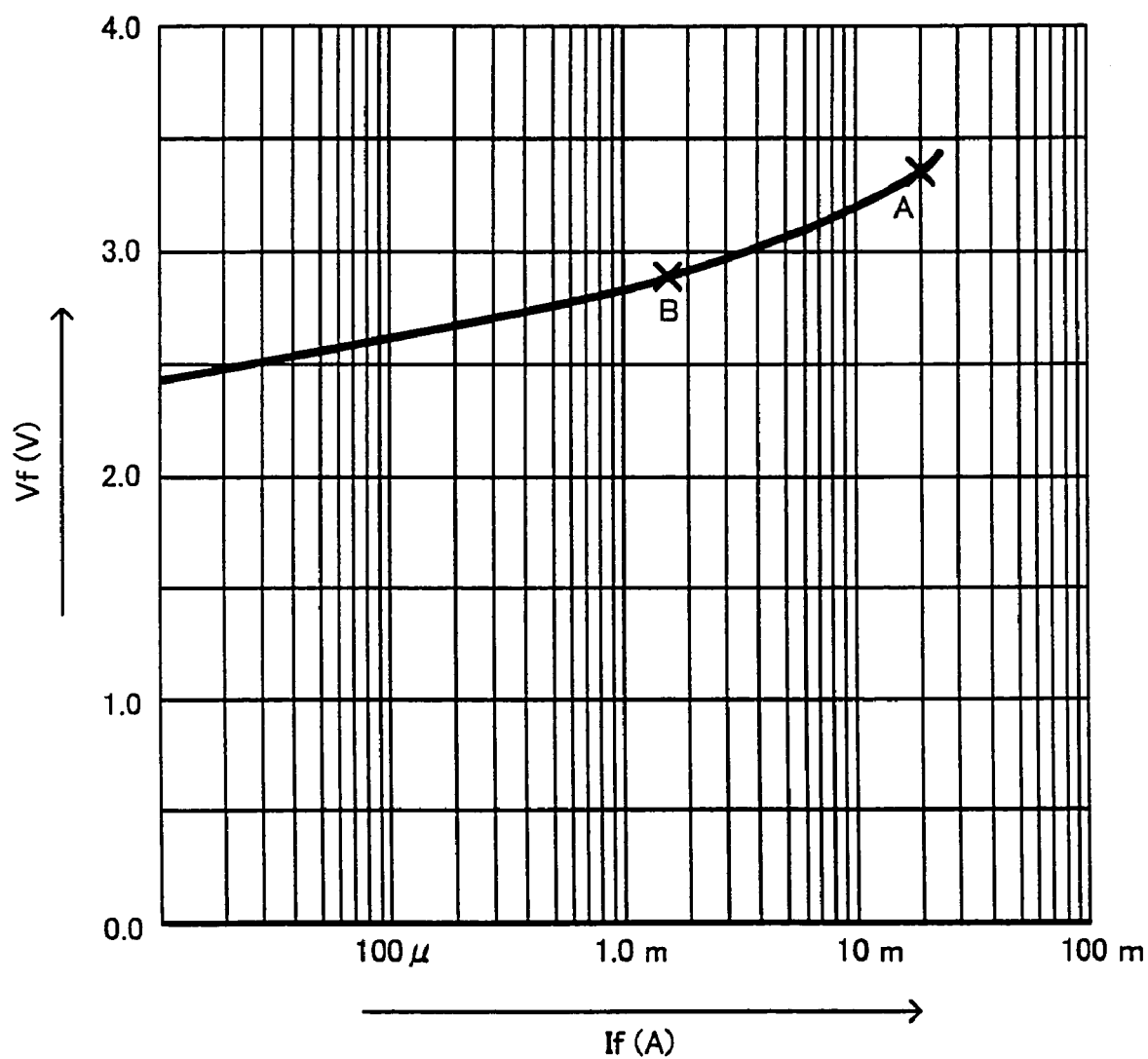
FIG. 2 is a graph showing the current-voltage characteristic of an LED.

The If–Vf characteristic of a white LED is shown in FIG. 2, where If stands for the current flowing through the LED and Vf for the voltage applied to the LED. In FIG. 2, the characteristic curve is plotted on a semi-logarithmic scale with the abscissa representing current If in logarithm and the coordinate representing voltage Vf. This LED emits light when current If is in a broad range (e.g. from 1.5 mA (point B) to 20 mA (point A)). As current If is varied, the luminance of the LED changes, in accordance with the magnitude of current If.

When current If is 20 mA (point A), the LED is activated by voltage Vf of 3.4 V applied in forward direction. However, not all of the LEDs necessarily have the same characteristic. For example, forward activation voltage Vf can differ from one LED to another in the range from about 3.4 V to about 4.0 V when current If is 20 mA. As seen in this example, white LEDs generally have higher forward activation voltage Vf than LEDs of other colors. In order to activate three white LEDs in series, the output voltage Vo1 must be at least 12.0 V or more.

Figure 3:
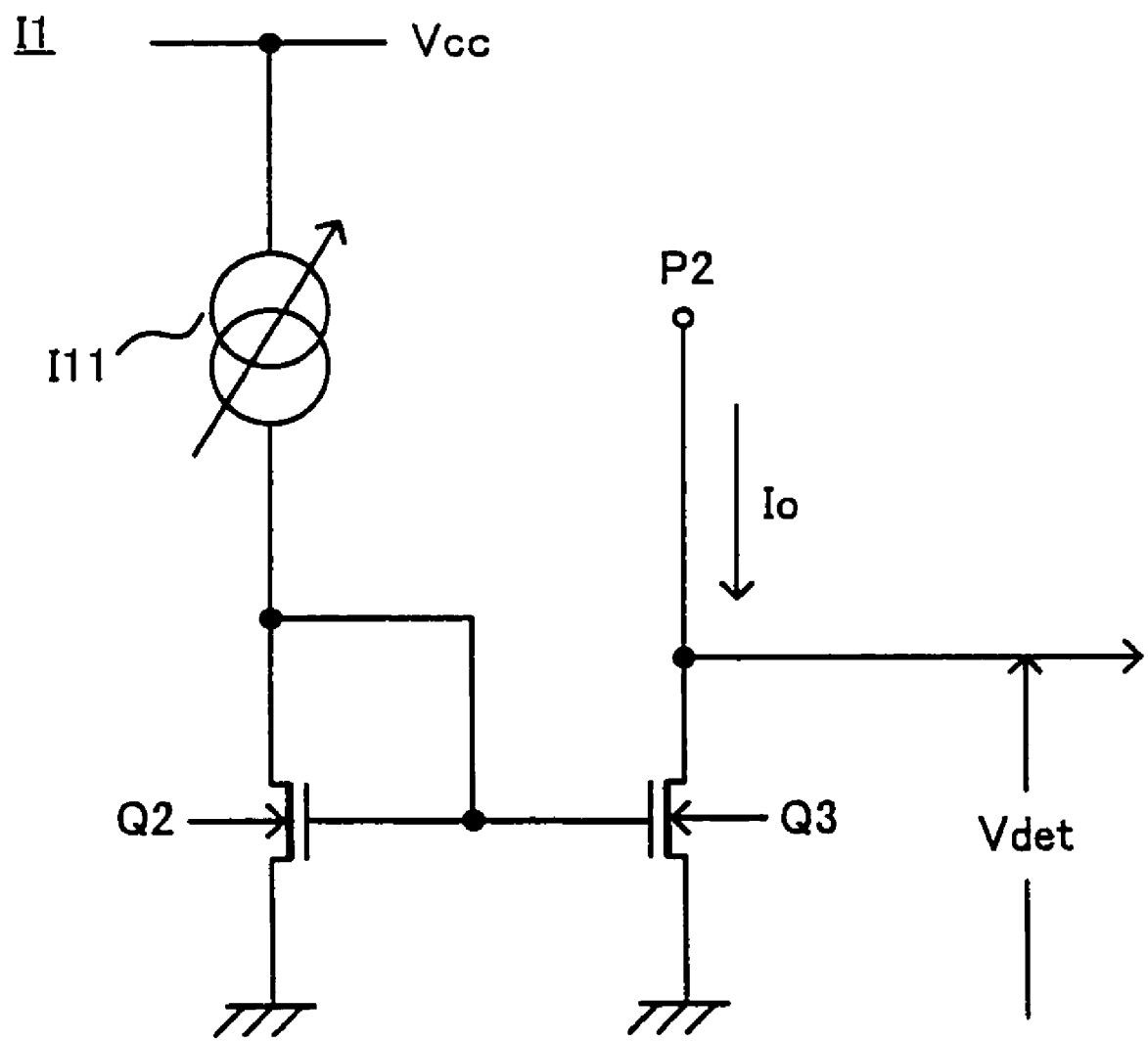
FIG. 3 is a schematic circuit diagram of a constant-current source I1.

FIG. 3 shows an exemplary circuit arrangement of a constant-current source I1. As shown in FIG. 3, a constant-current circuit I11 and an N-type MOS transistor (hereinafter referred to as N-type transistor) Q2 are connected in series with each other between a power supply voltage Vcc and the ground. The drain and the gate of this N-type transistor Q2 are directly connected together. In addition to the N-type transistor Q2, a further N-type transistor Q3 having higher driving capability than the N-type transistor Q2 is provided to flow the drive current Io. The gate of the N-type transistor Q2 on the input-side is connected to the gate of the N-type transistor Q3 on output-side to form a current mirror circuit.

In FIG. 3, the magnitude of the drive current Io flowing through the N-type transistor Q3 may be arbitrarily set to a preferred value. This can be done by adjusting the magnitude of the current flowing through the constant-current circuit I11.

Referring back to FIG. 1 again, the constant-current source I1 can perform constant-current operation if it is impressed with a voltage higher than its saturation voltage of about 0.3 V, for example (which is the saturation voltage of the N-type transistor Q3 of FIG. 3). The portion of the voltage exceeding the saturation voltage (about 0.3 V), which is not necessary as the drive current, results in a power loss (being equal to voltage×current) inside the constant-current source I1. The output voltage Vo1 of the power supply circuit 100 is controlled so as to equalize the voltage drop Vdet across the constant-current source I1 to the reference voltage Vref. Therefore, the reference voltage Vref is set to a level slightly higher than the saturation voltage (about 0.3 V) of the transistor used in the constant-current source I1.

Figure 4:
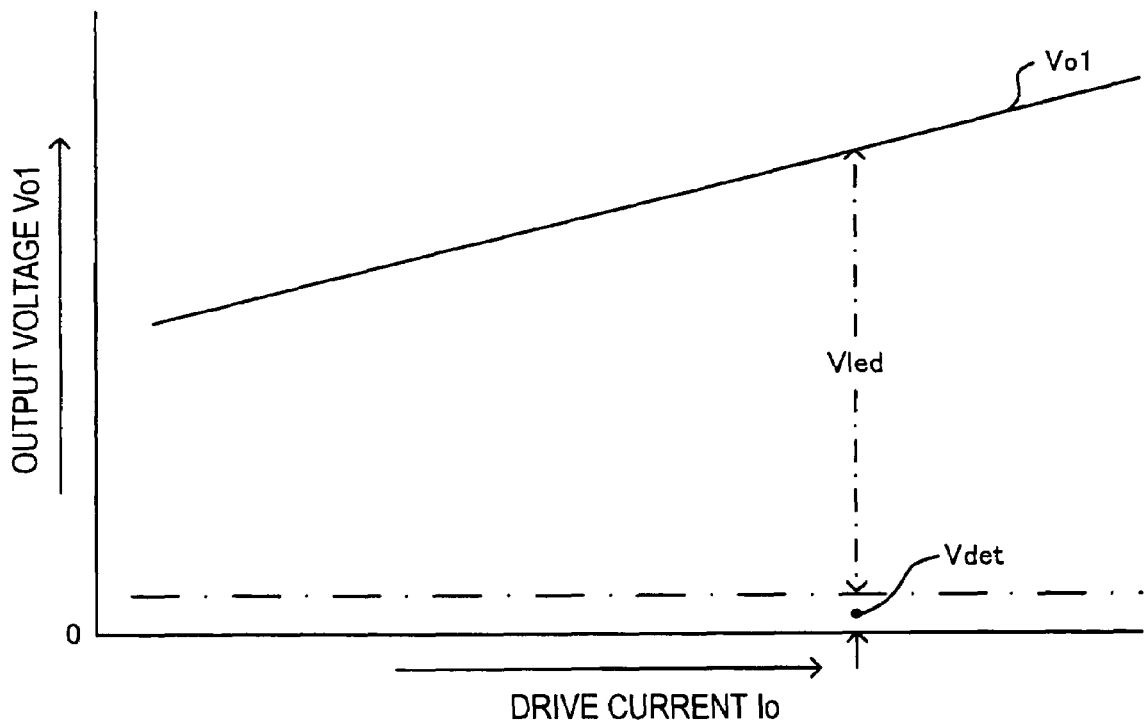
FIG. 4 is a graph showing the drive current-output voltage characteristic of a first dc-dc-conversion type power supply circuit of FIG. 1.

Operation of the load driving device thus configured will now be described with further reference to FIG. 4 showing the drive current-output voltage characteristic of the driving device. First, the magnitude of the drive current Io to be passed through the LEDs of the load 10 is set for the constant-current circuit I11. Then on-off switching operation of the switch Q1 is started in the switching power supply circuit 100. This causes the output voltage Vo1 to rise gradually.

As a consequence, the detection voltage Vdet will become equal to the reference voltage Vref, thereby causing the drive current Io to flow through the LEDs LED1–LED3 of the load 10. The LEDs will be activated to emit light at the predetermined luminance.

It should be appreciated that even if the forward voltage Vf characteristic varies from one LED to another for the LEDs LED1–LED3, only the output voltage Vo1 deviates from a predetermined value, without affecting the luminance of the LEDs LED1–LED3. The detection voltage Vdet, which represents the voltage drop across the constant-current source I1, is fixed. Hence, the output voltage Vo1 is equal to the constant detection voltage Vdet plus the voltage drop Vled (=3×Vf) across the LEDs LED1–LED3 in accord with the drive current Io at that time.

If the luminance of the LEDs LED1–LED3 needs to be changed, magnitude of the drive current Io may be changed. For example, if the drive current Io is increased, the luminance of the LEDs LED1–LED3 will increase accordingly. With this increase in the drive current Io, the voltage drop Vled across the LEDs LED1–LED3 becomes larger, in accordance with the Io–Vo1 characteristic shown in FIG. 2. The slope of the Vo1-line of FIG. 4 depends on the If–Vf characteristic shown in FIG. 2.

Since the voltage drop Vled across the LEDs LED1–LED3 increases in accord with the increase in the drive current Io, the output voltage Vo1 increases as shown by the characteristic curve of FIG. 4. However, since the detection voltage Vdet is fixed, the loss of power in the constant-current source I1 does not increase any further even if the drive current is increased to enhance the luminance. Thus, the load driving device maintains a high operating efficiency.

Figure 5:
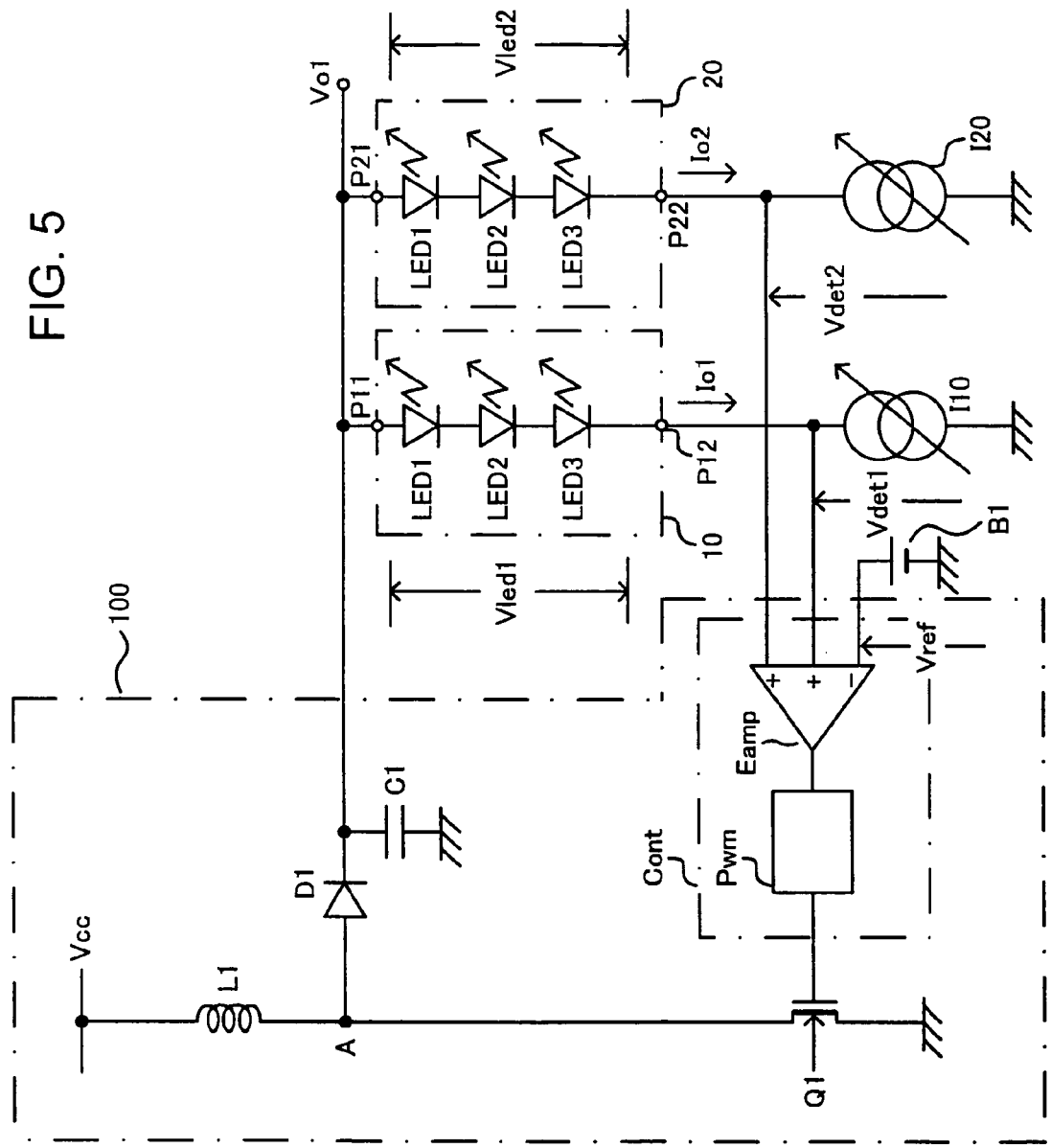
FIG. 5 is a schematic circuit diagram of a load driving device in accordance with a second embodiment of the invention.

FIG. 5 shows a circuit structure of a load driving device in accordance with a second embodiment of the invention. As shown in FIG. 5, the load driving device has a further load 20 in addition to the forgoing load 10. Furthermore, a constant-current source I20 is provided in association with the load 20. It should be understood that more than two loads can be added.

In the arrangement shown in FIG. 5, a constant-current source I10 is connected in series with the load 10, through which flows a drive current Io1. The voltage drop across the constant-current source I10 is utilized as a first detection voltage Vdet1. Similarly, a constant-current source I20 is connected in series with the load 20, through which flows a drive current Io2. The voltage drop across the constant-current source I20 is used as the second detection voltage Vdet2. Symbols P11, P12, P21, and P22 indicate terminals for connection with the loads.

An error amplifier Eamp of the control circuit Cont has two non-inverting input terminals (+) and one inverting input terminal (−). The two non-inverting input terminals (+) are fed with a first detection voltage Vdet1 and a second detection voltage Vdet2, one for each terminal, while the inverting input terminal (−) is fed with the reference voltage Vref. In the error amplifier Eamp, the lower one of the first detection voltage Vdet1 and the second detection voltage Vdet2 is compared with the reference voltage Vref. Rest of the circuit structure is the same as that of the first embodiment shown in FIG. 1.

The load driving device of FIG. 5 can adjust the individual drive currents Io1 and Io2 independently. The lower one of the voltage drops Vdet1 and Vdet2 of the constant-current sources I10 and I20, respectively, is automatically selected in the controlled switching operation performed by the power supply circuit 100, thereby securing operations of the constant-current sources I10 and I20 providing the constant drive current Io1 and Io2 to the multiple loads 10 and 20.

Thus, the second embodiment provides the same merits as the first if multiple loads are involved.

Figure 6:
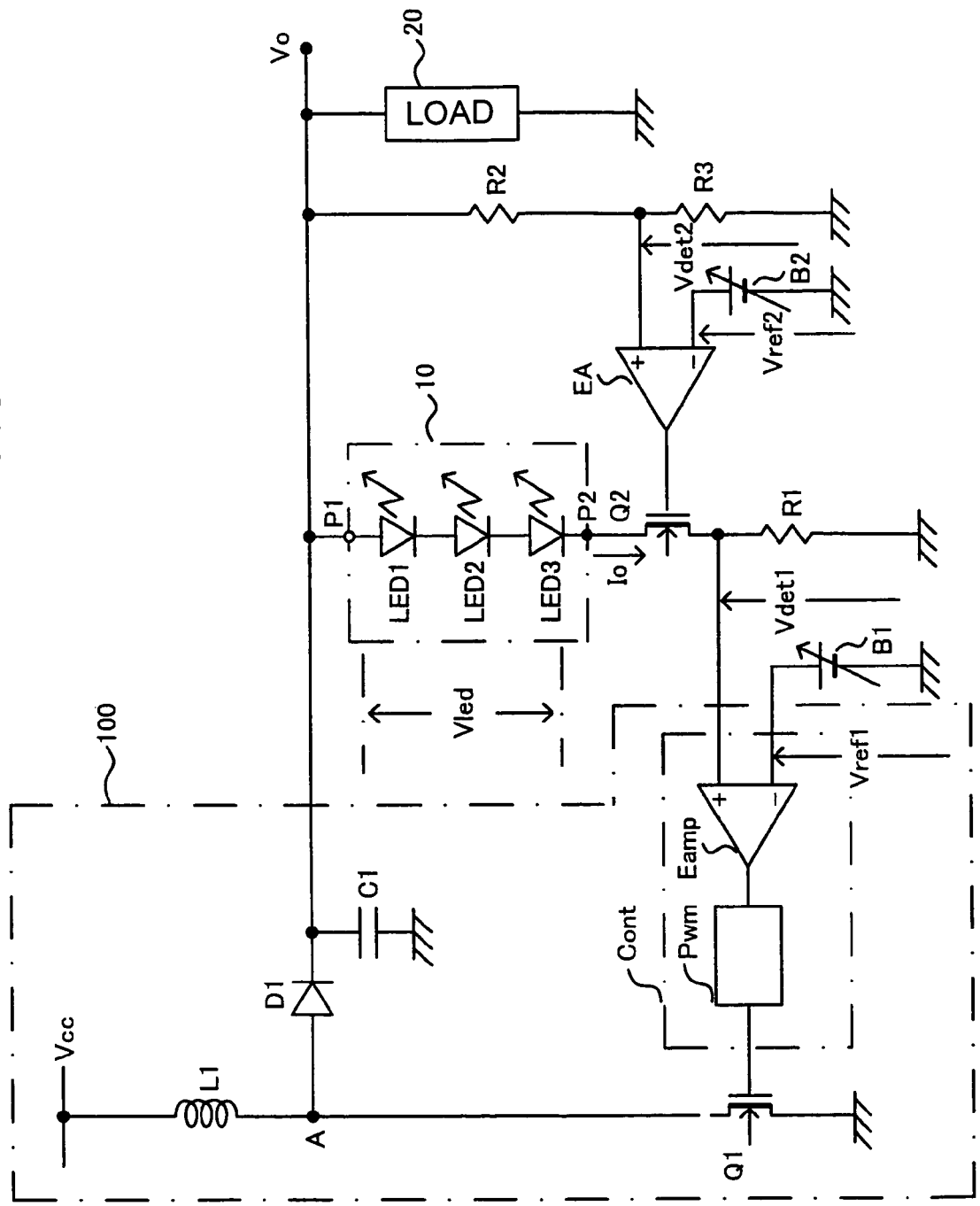
FIG. 6 is a schematic circuit diagram of a load driving device in accordance with a third embodiment of the invention.

FIG. 6 shows a circuit structure of a load driving device in accordance with a third embodiment of the invention. As seen in FIG. 6, the switching power supply circuit 100 has the same configuration as the one shown in FIG. 1.

In the third embodiment, connected in series between a node providing an output voltage Vo and the ground are a first external load (referred to as first load) 10 driven by a predetermined constant current, a variable-resistance means in the form of N-type transistor Q2 having variable resistance in response to a control signal, and a resistor R1 serving as a current detection means. The first load 10 is a load having an operating point that depends on the magnitude of the current flowing through it. In this example, the load 10 is provided with the drive current Io of a predetermined magnitude. The voltage drop across the resistor R1 is used as the first detection voltage Vdet1.

The control circuit Cont is fed with the first detection voltage Vdet1 along with a first reference voltage Vref1 from a reference voltage source B1.

The first load 10 is the same as the load 10 of FIG. 1. Connected between a node having the output voltage Vo and the ground is a second external load (referred to as second load) 20 driven by a voltage higher than the predetermined voltage V1.

A voltage dividing circuit consisting of resistors R2 and R3 is provided to detect the output voltage Vo. One of the divided voltages serves as the second detection voltage Vdet2. An error amplifier EA is provided at the non-inverting input terminal (+) thereof with the second detection voltage Vdet2, and at the inverting input terminal (−) thereof with the second reference voltage Vref2 received from a reference voltage source B2. The second detection voltage Vdet2 and the second reference voltage Vref2 are compared in the error amplifier EA to generate a control signal in accord with the difference between them. The control signal is supplied to the gate of the N-type transistor Q2.

In order to drive the second load 20 at the voltage higher than the predetermined voltage V1, the second reference voltage Vref2 is set to the voltage V1×R3/(R2+R3) obtained by dividing the predetermined voltage V1 by the resistors R2 and R3. As a result, when the output voltage Vo is higher than the predetermined voltage V1, the N-type transistor Q2 is switched on and has an extremely small resistance. That means that the transistor Q2 is virtually short-circuited (or in a low-resistance state). On the other hand, when the output voltage Vo becomes lower than the predetermined voltage V1, the resistance of the N-type transistor Q2 becomes high. Thus, the N-type transistor Q2 functions as a variable-resistance means, i.e. means for varying its resistance in response to a control signal.

Figure 7:
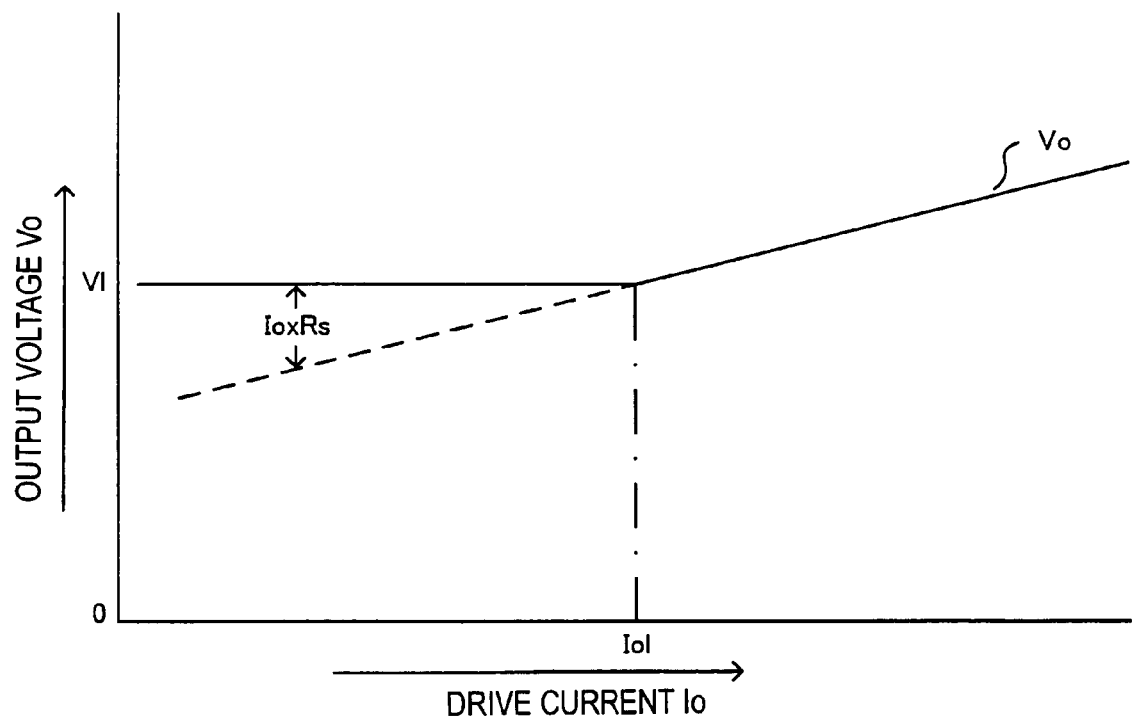
FIG. 7 is a graph showing the drive current-output voltage characteristic of a third dc-dc-conversion type power supply circuit of FIG. 6.

Operation of the load driving device thus configured will now be described with additional reference to FIG. 7 showing the Io–Vo characteristic of the device, where Io and Vo stand for the drive current and output voltage, respectively. In this load driving device, the output voltage Vo is maintained at the predetermined voltage V1 when the drive current Io is less than a predetermined magnitude Io1, as shown in FIG. 7. On the other hand, when the drive current Io exceeds the predetermined magnitude Io1, the output voltage Vo increases in accord with the increase in the drive current Io.

In operation, the first reference voltage Vref1 (=Io×R1) is set up in accord with the magnitude of the drive current Io to be supplied to the LEDs of the first load 10. Suppose now that the drive current Io is set larger than the predetermined magnitude Io1.

Then controlled on-off switching operation of the switch Q1 is started in the switching power supply circuit 100 such that the first detection voltage Vdet1 becomes equal to the first reference voltage Vref1. The switching operation causes the output voltage Vo to rise gradually.

While the output voltage Vo is less than the predetermined voltage V1, the second detection voltage Vdet2 is smaller than the second reference voltage Vref2. As a consequence, the N-type transistor Q2 will not be turned on, thereby sustaining a high resistance. Hence, the drive current Io is insufficient to the load, and the first detection voltage Vdet1 is lower than the first reference voltage Vref1, causing the output voltage Vo to rise gradually.

The rise of the output voltage Vo eventually equalizes the first detection voltage Vdet1 to the first reference voltage Vref1. Under this condition, the intended drive current Io flows through the LEDs LED1–LED3 of the first load 10, thereby activating the LEDs to emit light with a predetermined luminance.

Under this condition, if the luminance characteristic of the LEDs LED1–LED3 fluctuates from one LED to another, the output voltage Vo deviates from a predetermined value due to the fluctuations, but luminance of the LEDs LED1–LED3 will be little affected. As a consequence, the output voltage Vo becomes equal to the first detection voltage Vdet1 (which equals the first reference voltage Vref1) plus the voltage drop Vled (=3×Vf) across the LEDs LED1–LED3 driven by the drive current Io.

The output voltage Vo is then larger than the predetermined voltage V1. Hence the second detection voltage Vdet2 derived from the output voltage Vo through voltage division is larger than the second reference voltage Vref2. Under this condition, the N-type transistor Q2 is in ON state under the control of the control signal received from the error amplifier EA. The resistance of the N-type transistor Q2 under this condition is extremely small and it can be said that the transistor Q2 is virtually short-circuited.

To make the luminance of the LEDs LED1–LED3 larger, the first reference voltage Vref1 may be raised, which in turn increases the drive current Io. With the drive current Io increased, luminance of the LEDs LED1–LED3 will be enhanced more. The voltage drop Vled across the LEDs LED1–LED3 also becomes larger, in accordance with the characteristic shown in FIG. 2. The slope of the output voltage Vo shown in FIG. 7 is determined by the If–Vf characteristic of FIG. 2.

Since the voltage drop Vled across the LEDs LED1–LED3 increases in accord with the increase in the drive current Io, the output voltage Vo increases in accord with Io as shown in FIG. 7.

Conversely, in order to decrease the luminance of the LEDs LED1–LED3, the first reference voltage Vref1 may be lowered to reduce the drive current Io. As the drive current Io is reduced, the luminance of the LEDs LED1–LED3 decreases accordingly. Then the voltage drop Vled across the LEDs LED1–LED3 also decreases in accord with the If–Vf characteristic shown in FIG. 2.

If the drive current Io is set to a smaller magnitude than the predetermined current magnitude Io1, the voltage drop Vled across the LEDs LED1–LED3 will be smaller accordingly. The output voltage Vo then tends to decrease below the predetermined voltage V1.

However, the second detection voltage Vdet2 then becomes equal to or lower than the second reference voltage Vref2. As a result, the resistance Rs of the N-type transistor Q2 increases in response to the control signal received from the error amplifier EA.

With the increase in the resistance Rs of the N-type transistor Q2, drive current Io decreases and so does the first detection voltage Vdet1. The power supply circuit 100 operates such that the first detection voltage Vdet1 becomes equal to the first reference voltage Vref1. Then, the output voltage Vo rises by a magnitude equal to the voltage drop Io×Rs across the N-type transistor Q2, which is the product of the drive current Io and the resistance Rs of the N-type transistor Q2.

As a result, when the drive current Io is set to a smaller magnitude than predetermined magnitude Io1, the N-type transistor Q2 functions as a variable-resistance means for maintaining the output voltage Vo at the predetermined voltage V1.

Although a voltage drop Io×Rs is induced by the N-type transistor Q2, the second load 20 is provided with the output voltage Vo larger than the predetermined voltage V1.

Figure 8:
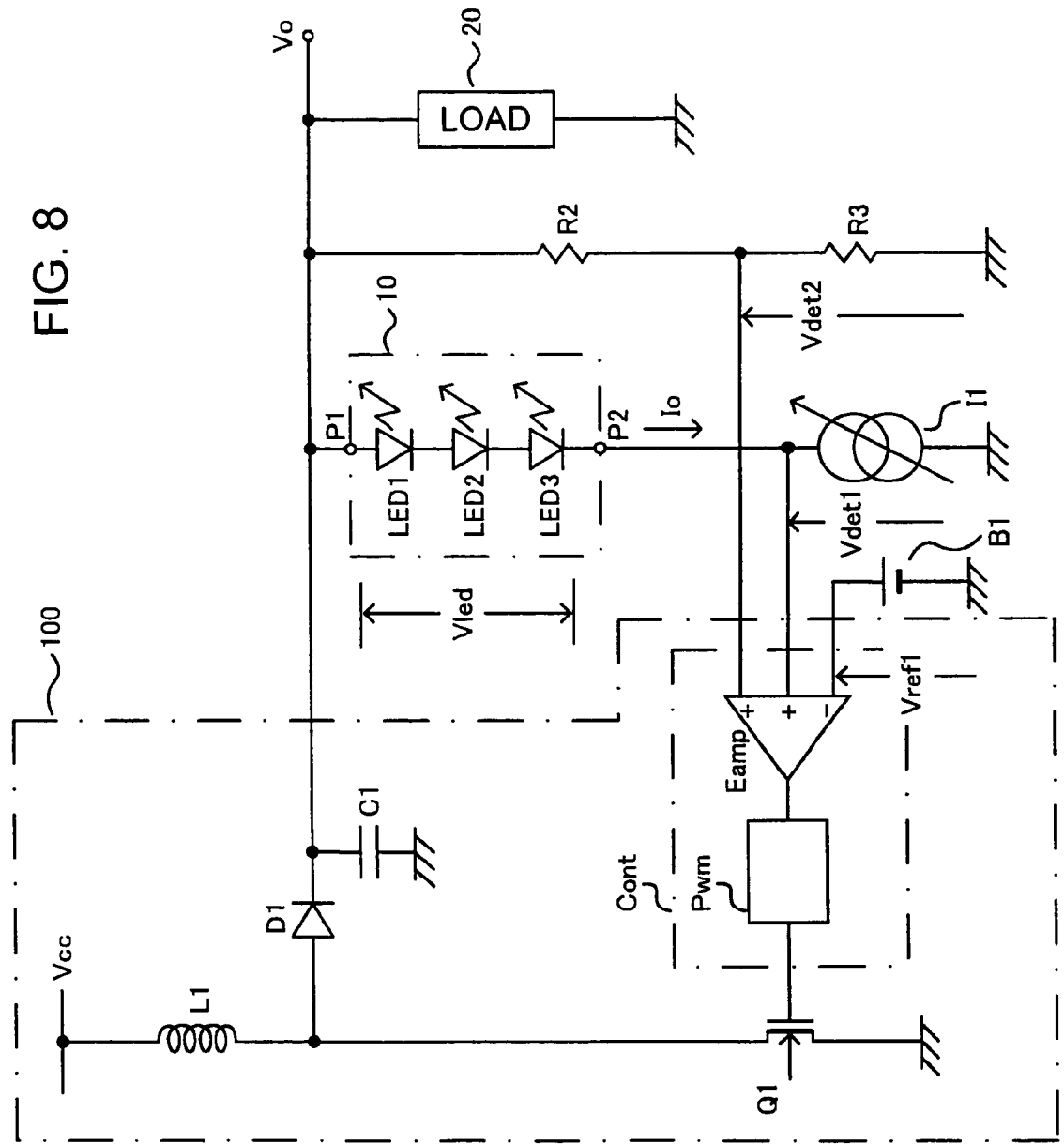
FIG. 8 is a schematic circuit diagram of a load driving device in accordance with a fourth embodiment of the invention.

FIG. 8 shows a circuit structure of a load driving device in accordance with a fourth embodiment of the invention. As seen in FIG. 8, this embodiment lacks the N-type transistor Q2 serving as a variable-resistance means, error amplifier EA for controlling the N-type transistor Q2, and reference voltage source B2 of FIG. 6. However, the embodiment has a three-input type error amplifier Eamp substituting for the two-input type error amplifier of FIG. 6.

A first non-inverting input terminal (+) of the error amplifier Eamp is fed with the first detection voltage Vdet1, and a second non-inverting input terminal (+) is fed with the second detection voltage Vdet2. The inverting input terminal (−) of the error amplifier Eamp is fed with the first reference voltage Vref1.

This error amplifier Eamp automatically selects the lowest one of the first and second detection voltages Vdet1 and Vdet2, respectively, inputted to the first and second non-inverting input terminals (+), respectively, and compares the selected one with the first reference voltage Vref1.

As shown in FIG. 8, the resistor R1 of FIG. 6 serving as a drive current detection means is replaced by an adjustable-current type constant-current circuit I1. This constant-current source I1 is the same as one shown in FIG. 3. In this arrangement too, the output voltage Vo of the power supply circuit is controlled so as to equalize the first reference voltage Vdet1 (representing the voltage drop across the constant-current source I1) to the first reference voltage Vref. Therefore, the reference voltage Vref1 is set to a level slightly larger than the saturation voltage (about 0.3 V) of the transistor used in the constant-current source I1.

On the other hand, the voltage division ratio of the resistors R2 and R3 is set such that the second detection voltage Vdet2 balances the first reference voltage Vref1 when the output voltage Vo has the predetermined voltage V1, i.e., V1×R3/(R2+R3)=Vref1.

The rest of the circuit structure of FIG. 8 is the same as that of the third embodiment shown in FIG. 6.

In the embodiment shown in FIG. 8, the lower one of the first detection voltage Vdet1 representing the voltage drop across the constant-current source I1 and the second detection voltage Vdet2 obtained by voltage division of the output voltage Vo is automatically chosen in the controlled switching operation performed by the power supply circuit 100.

The load driving device shown in FIG. 8 also provides the same output characteristic as the third embodiment shown in FIG. 6. This can be seen as follows. Referring to FIG. 7, there is shown Io–Vo characteristic of the load driving device, in which the output voltage Vo is maintained at the predetermined voltage V1 when the drive current Io is less than the predetermined magnitude Io1, but the output voltage Vo increases with the drive current Io if the drive current Io exceeds the predetermined magnitude Io1.

Incidentally, the resistor R1 serving as the current detection means in the arrangement of FIG. 6 may be replaced by the constant-current source I1 of FIG. 5. In this case, the constant-current source I1 is adapted to adjust the magnitude of the constant-current. The first reference voltage Vref1 may be fixed.

I claim:

1. A load driving device, comprising
a power supply circuit for supplying to a load an output voltage by converting an input voltage; and
a constant-current source connected in series with said load and providing an adjustable constant current to said load, wherein
said power supply circuit including a coil, a switch connected in series with said coil for switching on and off the power to said coil, and a rectification element provided between the node of said coil and switch and an output terminal of said power supply circuit, and is adapted to control said output voltage so as to keep constant the voltage at the node of said load and constant-current source.

2. The load driving device according to claim 1, wherein said power supply circuit is fed with a reference voltage and said voltage at the node, and controls said output voltage so as to equalize said voltage at the node to said reference voltage.

3. The load driving device according to claim 2, wherein said constant-current source has a current mirror circuit constituted of
a constant-current circuit providing an adjustable constant current;
an input-side current mirroring transistor connected in series with said constant-current circuit; and
an output-side current mirroring transistor receiving the same control input as said input-side transistor, wherein the adjustable constant current is supplied to said output-side transistor.

4. The load driving device according to claim 3, wherein said constant voltage is higher than the saturation voltage of said output-side current mirroring transistor.

5. The load driving device according to claim 1, wherein said power supply circuit further comprises
a smoothing circuit connected to one end of said rectification element providing its output voltage; and
a control circuit for switching on and off said switch so as to equalize the voltage at the node of said load and constant-current source to a reference voltage.

6. The load driving device according to claim 1, comprising multiple sets of one load and one constant-current source as defined in claim 1, wherein
said one constant-current source and one load of each set are connected in series with each other such that said one constant-current source provides an adjustable constant current to said one load and wherein
said output voltage is controlled such that the lowest one of the voltages (hereinafter referred to as the lowest voltage) at the nodes of said multiple loads and multiple constant-current sources remains constant.

7. The load driving device according to claim 6, wherein said power supply circuit further comprises a smoothing circuit connected to one end of said rectification element providing its output voltage; and a control circuit for switching on and off said switch so as to equalize said lowest voltage to a reference voltage.

8. The load driving device according to claim 1, wherein said power supply circuit further comprises a smoothing circuit connected to one end of said rectification element providing its output voltage; and a control circuit for switching on and off said switch so as to equalize the voltage at the node of said load and constant-current source to a reference voltage.

9. A load driving device, comprising a power supply circuit for supplying to a load an output voltage by converting an input voltage; and a variable-resistance means having a resistance that varies in response to a control signal and a current detection means for detecting the magnitude of the current flowing through said variable-resistance means, both means connected in series with said load, wherein said power supply circuit is fed with a first reference voltage and a first detection voltage provided by said current detection means, and controls said output voltage so as to equalize said first detection voltage to said first reference voltage.

10. The load driving device according to claim 9, wherein said variable-resistance means has a low resistance when a voltage indicative of said output voltage exceeds a predetermined voltage and has a resistance that increases in accord with the decrease in said voltage indicative of said output voltage below said predetermined voltage.

11. The load driving device according to claim 10, further comprising error amplification means for outputting said control signal upon receipt of a second detection voltage in accord with said output voltage and a second reference voltage.

12. The load driving device according to claim 11, wherein said power supply circuit is a switching power supply circuit that includes a coil; and a switch for switching on and off the power to said coil.

13. A load driving device, comprising a power supply circuit for supplying to a load an output voltage by converting an input voltage; and a constant-current source connected in series with said load, wherein said constant-current source is a adjustable-current type constant-current source capable of providing an adjustable constant current; and said power supply circuit is fed with a reference voltage, a first detection voltage indicative of a voltage drop across said constant-current source, and a second detection voltage associated with said output voltage, and controls said output voltage so as to equalize lower one of said first detection voltage and second detection voltage to said reference voltage.

14. The load driving device according to claim 13, wherein said power supply circuit is a switching power supply circuit that includes a coil; and a switch for switching on and off the power to said coil.

15. A portable apparatus, comprising at least one load having an operating point that depends on the magnitude of the current flowing through said load; and a load driving device for driving said load as defined in any one of claims 1 through 14.

16. The portable apparatus according to claim 15, wherein said load is a set of light emitting diodes, said set containing at least one light emitting diode.

* * * * *